United States Patent [19]

Becker

[11] 4,179,591

[45] Dec. 18, 1979

[54] TELEPHONE COVER

[76] Inventor: William M. Becker, 5915 Onondoga Rd., Bethesda, Md. 20016

[21] Appl. No.: 921,118

[22] Filed: Jun. 30, 1978

[51] Int. Cl.² .............................................. H04M 1/02
[52] U.S. Cl. ................................................... 179/179
[58] Field of Search ............... 179/179, 189 R, 100 D, 179/100 C, 100 R

[56] References Cited

U.S. PATENT DOCUMENTS

| | | | |
|---|---|---|---|
| 1,734,124 | 11/1929 | Green et al. | 179/100 C |
| 1,819,362 | 8/1931 | Dunn | 179/100 C |
| 3,862,375 | 1/1975 | Thomas | 179/100 R |

FOREIGN PATENT DOCUMENTS 554290  6/1923  France .................................. 179/100 R

OTHER PUBLICATIONS

"The Telephone Store" advertisement, Jan. 1977.

"Touch Calling-The New, Easy Way to Phone", Automatic Electric Co. brouchure, 1968.

Primary Examiner—Thomas W. Brown
Attorney, Agent, or Firm—Berman, Aisenberg & Platt

[57] ABSTRACT

A decorative telephone housing in the form of a rectangular, hollow shell having top and side walls and open at the bottom, the shell partially enclosing an elongated bar pivoted at one end within the shell and extending across the interior with its free end protruding through an opening in a side wall of the shell, and a cradle for a handset fixed to the free end of the bar outside of the shell. When the shell is secured to the base of a telephone instrument, the bar rests on the switch actuating member within the shell, so that rocking movements of the bar, engendered by lifting the handset from and subsequently returning the handset to the cradle, cause the actuating member to switch the instrument to on and off condition.

4 Claims, 5 Drawing Figures

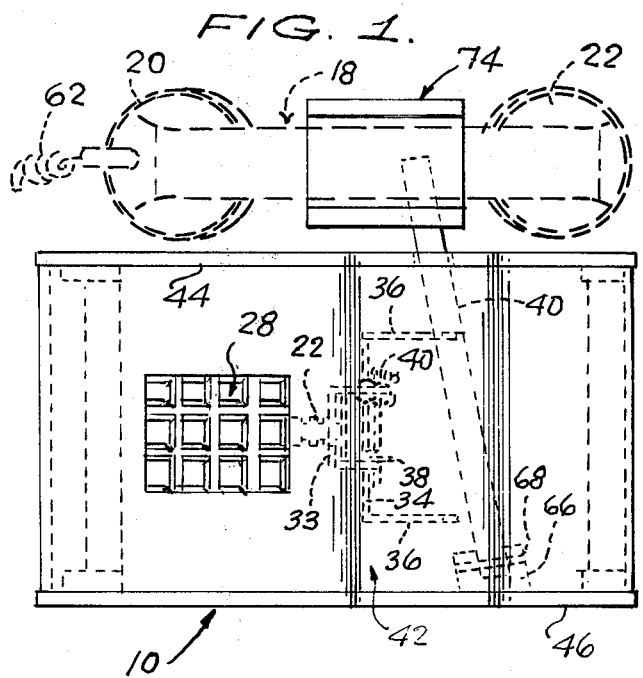
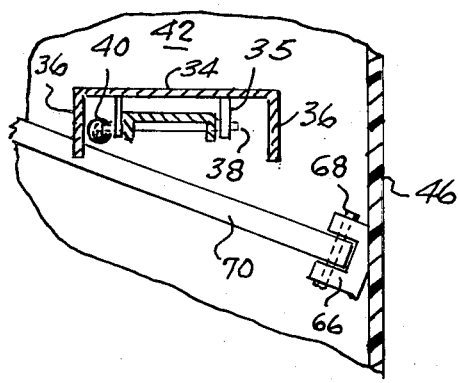
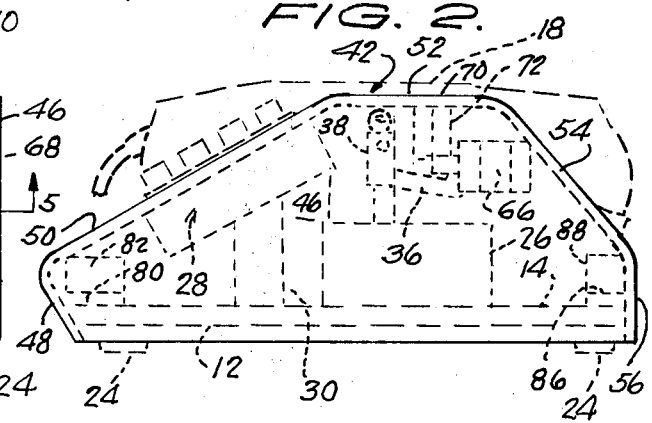
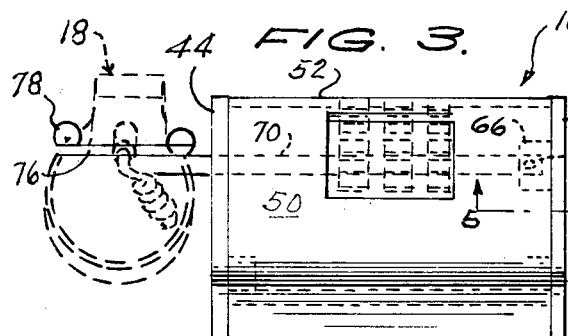
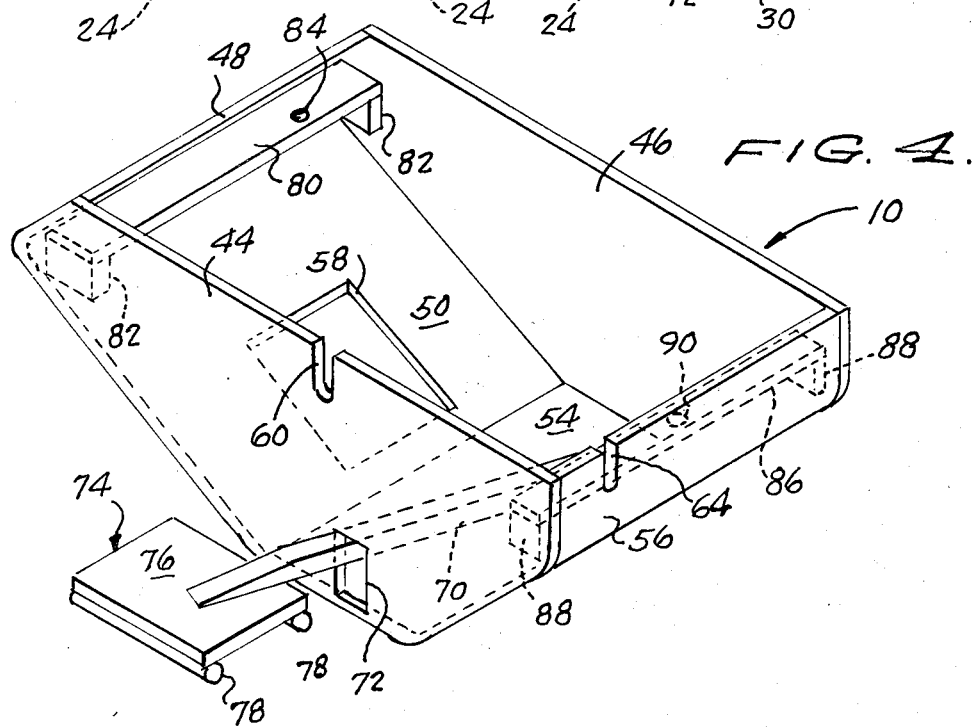

TELEPHONE COVER

BACKGROUND OF THE INVENTION

1. Field of the Invention

This invention relates to telephone instruments, and more particularly to an improved, decorative housing therefor.

2. Description of the Prior Art

Conventional telephones are available in many shapes and forms. Few, however, sacrifice functional shapes for more pleasing appearance such as would add to the decor of a modern office or decorated home. In particular, the conventional desk, or table top, telephone is of boxy shape, has four unattractive upstanding posts, for cradling the handset and seating the latter across the top of the instrument rather than alongside. In the alongside position, the handset would more harmoniously parallel the longitudinal dimensions of the base and handset and thus enhance the appearance.

SUMMARY OF THE INVENTION

The invention seeks to provide a telephone cover of greatly improved appearance, which may be substituted for a conventional cover without requiring any change in the operating works of the instrument, in the base to which the circuitry is attached, or in the means for securing the base and cover together. To this end the improved cover includes a rectangular, hollow shell having top and side walls, and open at the bottom. An elongated bar is pivoted at one end within the shell, extends across the hollow interior and has its free end protruding through an opening in a side wall of the shell. A cradle, for seating the instrument handset outside of and longitudinally of the shell, is fixed to the free end of the bar, and within the shell the bar rests on an arm of a conventional switch operating member. Thus, rocking movements of the bar caused by lifting the handset from and subsequently returning the handset to the cradle cause the operating member to switch the instrument on and off.

It will be apparent from the above, and from the subsequent fuller explanation, that it is a primary purpose of the invention to provide a telephone cover of more pleasing, attractive and decorative appearance, which will lend itself to substitution for a conventional cover and yield a more harmonious blend with the decor of the surrounding environment.

A further important object of the invention is to provide a telephone cover, having the above briefly described attributes, which may be readily substituted for a conventional cover without requiring any change in the instrument other than substitution of the housing shell alone.

Yet another important object of the invention is to provide a cover for a telephone instrument, having the above described characteristics, which is of simple, pleasing shape, free of unessential bends, recesses, nooks and crannies, which is easy to mold, or otherwise fabricate, and inexpensive to make.

BRIEF DESCRIPTION OF THE DRAWING

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several Figures, and in which:

FIG. 1 is a plan view of a telephone equipped with a cover according to the invention;

FIG. 2 is an elevational view of the telephone instrument taken from the side of FIG. 1 opposite the handset;

FIG. 3 is a front elevation of the telephone;

FIG. 4 is a perspective view of the cover alone removed from the telephone and inverted; and FIG. 5 is a fragmentary sectional view taken along line 5—5 of FIG. 3 and looking in the direction of the arrows.

BRIEF DESCRIPTION OF THE PREFERRED EMBODIMENT

Referring now more particularly to the drawings, the improved cover of the invention, given the general reference numeral 10, is illustrated as mounted on a standard telephone instrument of the desk, or table, type in place of the cover usually supplied.

The standard base 12 shown is a shallow, flat, metal pan having a low, upstanding, peripheral rim 14, and having secured thereon all of the standard electrical and other components of the instrument except the handset 18, which contains microphone 20 and receiver 22. The base 12 is supported on four, rubber, stud-like feet 24, and has a metal box 26 encasing electric circuit component parts, a dialing unit 28, illustrated as one of the push button type, mounted on a pair of metal brackets 30, and other parts, such as magnets, bells and the like, not shown, all affixed to the upper surface of base 12. Beneath the dialing unit is a main switch, not visible in the drawings, but moved by an operating member 32 which is spring pressed rightwardly as viewed in FIG. 1, to closed position of a gang of the switch members. The right end of the switch operating member is loosely clutched in the base of a U-shaped member 33, movable across a vertical standard 35 by a U-shaped actuator 34 having a pair of spaced arms 36,36. The actuator 34 is pivoted for limited swinging movement on a horizontal pivot pin 38, and is biased to the upper limit of its movement by vertical coil spring 40. In the last named position of the actuator 34, the operating member 32 is moved to the right as viewed in FIG. 1; the telephone switch is closed, and the instrument receives dial tone and is ready for use. When the arms 36 of the actuator are moved downwardly against the bias of spring 40, the switch is opened and the instrument is in its dormant condition.

As thus far described, the telephone instrument is completely standard and conventional. The improved cover 10 is substituted for the conventional cover using the same base, working parts, and mounting screws. Cover 10 is of generally rectangular shape and is a hollow shell open at the bottom preferably formed of a plastic material, although other materials may obviously be used. The cover includes a top wall 42, and two vertical, longitudinal walls 44,46. The top wall includes a forwardly and upwardly sloping, short portion 48, a rearwardly upwardly sloping portion 50, a horizontal portion 52, a downwardly rearwardly sloping portion 54 and a short vertical portion 56. The sloping portion 50 has a rectangular opening 58 through which protrudes the push buttons of dialing unit 28. If the dialing unit is one other than a push button unit, opening 58 may have a different shape, as for example, may be circular when a dial is used.

The side wall 44 is provided with a slot 60 opening to its bottom edge for passage of the handset cord 62 into the interior of the shell. A similar slot 64 is provided in wall portion 56 for passage of the cord, not shown, which connects the instrument to the telephone lines.

A U-shaped bracket 66, FIGS. 1, 2 and 5, is cemented, glued or otherwise affixed to the inner surface of wall 46 near its top, and a pin 68, traversing the space between the arms of the U, pivotally mounts one end of an elongated bar 70. The bar 70 crosses the interior of shell casing 10 at a slight angle, rests on the bulbous end of one of the arms 36 of actuator 34, passes through an elongated slot 72 extending downwardly from near the top edge of wall 44, and has its free end protruding outside shell 10. Rigidly affixed to the free end of bar 70, as by cement, glue or the like, is a cradle 74 for handset 18. As illustrated, the cradle may comprise merely a flat rectangular member 76 and a pair of rods 78,78 secured to the upper side along its longitudinal edges.

Within the shell, at the forward end, is a flat strip 80 supported by a pair of inverted legs 82,82 secured to the inner surfaces of walls 44,46. Located off center in strip 80 is a threaded opening 84 for receiving the standard mounting screw (not shown) normally extended upwardly from base 12. A similar strip 86 is mounted in the same manner by legs 88, 88, and has a central, threaded opening 90 for reception of a second base clamping screw. Thus, in substituting the improved cover 10 for a conventional cover, it is merely necessary to unscrew the two base clamping screws mentioned, lift off the standard cover, replace with improved cover 10, and tighten the same clamping screws by threading into openings 84 and 90. When this is done, bar 70 comes to rest on the end of one of the arms 36 of switch actuator 34, and placement of handset 18 on cradle 74 moves the telephone main switch to off condition through operating member 32.

In operation of the telephone equipped with the above described cover, it will be obvious that lifting of the handset from cradle 74, permits coil spring 40 to swing actuator 34, its arms 36 and the bar 70 to their upper positions and releases switch operator member 32 to move to its biased, switch closed condition, so that the phone receives dial tone and is ready for use. Upon completion of the call, the handset is replaced on cradle 74, lowering bar 70 and pressing the actuator to its lower limit of swinging movement. This presses switch operator 32 to the left as viewed in FIG. 1 against the internal switch bias, and opens the switch so that the instrument is in dormant condition.

It will be further apparent from the above description that the illustrated cover 10 is of simple, eye pleasing design, free of abrupt shape changes, nooks, recesses and crannies, and is thus easy and inexpensive to mold or make. The plastic from which it is formed may be transparent or opaque, and may have many different color pigments added to match the color decor of the room or office in which the phone is placed. Utilization of bar 70 and external cradle 74 enables the handset to rest parallel to rather than crosswise of the cover, and this alone greatly enhances the appearance of the instrument.

Although a certain specific embodiment of the invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. A substitute cover, to replace that of a modern, single line, desk, or table top, telephone, of the type which cradles the handset transversely between four fixed posts and across the top of the instrument, comprising a hollow shell of generally rectangular configuration having top and side walls and open at the bottom, said shell being adapted to be secured to the horizontal base of a telephone instrument by the normal securing means of the instrument so as to house without change or rearrangement its working circuits and parts other than the handset, said top wall having an upwardly and forwardly sloping rear portion, a generally flat, horizontal center portion and a forwardly and downwardly sloping forward portion, an opening in said forward portion of the top wall for reception of a telephone dialing unit, an elongated bar pivoted at one end within said shell and extending substantially entirely across the hollow interior with its free end protruding through an opening in a side wall of the shell, a cradle arranged to seat a handset alongside and longitudinally of said shell and fixed to the free end of said bar outside the shell, said bar being adapted to rest by gravity on a switch actuator within the shell and to be moved upwardly by the actuator when the handset is lifted from said cradle, and said opening in the side wall of the shell being sufficiently large to permit up and down rocking movements of the arm so that seating a handset on the cradle lowers the bar and moves the switch actuator and switch to off position, while lifting the handset from the cradle permits the switch actuator to lift the bar and close the telephone switch to its on position, whereby removing the normal instrument cover and substituting said cover vastly improves the aesthetic appearance of the telephone without changing or moving any other component parts or circuits and without need for any special tools.

2. A cover for a telephone according to claim 1, wherein said pivoted end of the bar has a generally horizontal pivot pin passing therethrough and projecting from both sides, the ends of said pivot pin being rotatably mounted in aligned openings in the legs of a U-shaped block which is secured near the top of the interior surface of a side wall of the shell.

3. A cover for a telephone according to claim 2, wherein said opening through which the free end of said bar extends is a slot in the opposite side wall of the shell extending vertically downward from the upper edge.

4. A cover for a telephone according to claim 1, wherein said shell includes a pair of generally horizontal strips each having a threaded opening for receiving a screw forming part of said normal securing means to fasten the shell to a telephone base, said strips being each supported near the bottom edge of the shell, at its front and rear, by a pair of inverted legs secured to the inner surfaces of the side walls.

* * * * *